(12) United States Patent
Tsuji

(10) Patent No.: US 6,184,778 B1
(45) Date of Patent: Feb. 6, 2001

(54) COMMUNICATION NETWORK SYSTEM AND REBUILDING METHOD THEREOF

(75) Inventor: Kiyotaka Tsuji, Tokyo (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/101,618

(22) PCT Filed: Nov. 12, 1997

(86) PCT No.: PCT/JP97/04121

§ 371 Date: Jul. 13, 1998

§ 102(e) Date: Jul. 13, 1998

(87) PCT Pub. No.: WO98/21854

PCT Pub. Date: May 22, 1998

(30) Foreign Application Priority Data

Nov. 12, 1996 (JP) .................................................. 8-300441

(51) Int. Cl.[7] .................................................. G08B 9/00
(52) U.S. Cl. .................................. 340/286.02; 370/94.3; 370/410; 370/439; 709/224; 709/250
(58) Field of Search ..................... 340/286.02; 370/94.1, 370/94.3, 60, 85.13, 32.1, 410, 439, 380, 388; 359/119, 121; 709/250, 224

(56) References Cited

U.S. PATENT DOCUMENTS

| | | | | |
|---|---|---|---|---|
| 5,195,090 | * | 3/1993 | Belliger et al. | 370/94.1 |
| 5,220,562 | * | 6/1993 | Takada et al. | 370/85.13 |
| 5,305,308 | * | 4/1994 | English et al. | 370/32.1 |
| 5,506,847 | * | 4/1996 | Shobatake | 370/94.3 |
| 5,886,992 | * | 3/1999 | Raatikainen et al. | 370/410 |

FOREIGN PATENT DOCUMENTS

| | | |
|---|---|---|
| 62-214747 | 9/1987 | (JP) . |
| 1-105637 | 4/1989 | (JP) . |
| 1-195737 | 8/1989 | (JP) . |
| 3-72743 | 3/1991 | (JP) . |
| 3-179845 | 8/1991 | (JP) . |
| 3-228446 | 10/1991 | (JP) . |
| 3-231535 | 10/1991 | (JP) . |
| 5-227183 | 9/1993 | (JP) . |
| 5-308369 | 11/1993 | (JP) . |
| 7-87113 | 3/1995 | (JP) . |
| 7-107107 | 4/1995 | (JP) . |
| 8-8943 | 1/1996 | (JP) . |
| 8-508146 | 8/1996 | (JP) . |
| 9-149061 | 6/1997 | (JP) . |

* cited by examiner

Primary Examiner—Edward Lefkowitz
Assistant Examiner—Davetta W. Goins
(74) Attorney, Agent, or Firm—Finnegan, Henderson, Farabow, Garrett & Dunner, L.L.P.

(57) ABSTRACT

A communications network system capable of reducing the time from the occurrence of a trouble to the rebuilding of the system and a rebuilding method thereof. In a communications network system which comprises a plurality of node devices (10-1 to 10-4) distributed at a plurality of positions and transmission lines (1a, 1b) for connecting the plurality of node devices, one of the plurality of node devices is set as a master station (10-1) to operate the system, when the master station has a trouble, the individual node device makes an inquiry to the other node devices, and a node device which has confirmed that no other node device has a higher priority than itself becomes a substitute master station to take the place of the troubled master station to continue the operation of the system.

14 Claims, 11 Drawing Sheets

COMMUNICATION NETWORK SYSTEM AND REBUILDING METHOD THEREOF

TECHNICAL FIELD

The invention relates to a communications network system configured by a wide area network or a local area network (LAN) and a rebuilding method thereof, and more particularly to a communications network system which is configured so that the time from the occurrence of trouble in the system to the rebuilding of the system can be greatly reduced, and a rebuilding method thereof.

BACKGROUND ART

Such a type of communications network system conventionally known is based on an STM (synchronous transfer mode).

FIG. 10 is a block diagram showing a conventional communications network based on STM (synchronous transfer mode). The communications network system of FIG. 10 has four node devices 1-1 to 1-4 connected through optical transmission lines 1a, 1b and the node device 1-1 determined as a master station.

The node device 1-1 as the master station is connected to an operation management device 2-1 which collects information on operation conditions of the node devices 1-1 to 1-4 and the optical transmission lines 1a, 1b and displays the collected results on, for example, a screen.

The node device 1-1 as the master station in the configuration shown in FIG. 10 is shown in detail in the block diagram of FIG. 11.

In FIG. 11, the node device 1-1 as the master station comprises an optical transmission line interface 3 connected to the optical transmission lines 1a, 1b, a frame generation part 4 which generates a transmission frame and circulates it through the respective node devices, a frame termination part 5 which examines a transmission frame having come back through the respective node devices, a control part 6 which is connected to the operation management device 2-1 to control comprehensively the entire operation of the node device 1-1, and an interface part 7 connected to an external interface.

In the above-described communications network system based on STM (synchronous transfer mode), the respective node devices 1-1 to 1-4 must synchronize at intervals of, for example, 125 μS; then as shown in FIG. 11, the node device 1-1 as the master station needs the frame generation part 4 to generate a transmission frame at intervals of 125 μS and circulate it through the respective node devices. Besides, the node device 1-1 as the master station needs the frame termination part 5 in order to examine the transmission frame having come back through the respective node devices and to transmit it again at intervals of 125 μS.

To improve reliability of the system, it is necessary to have a substitute master station, for example, the node device 1-3 shown in FIG. 10, which can take the place of the node device 1-1 as the master station in case that the node device 1-1 as the master station has a trouble. And, the node device 1-3 to be a substitute master station also needs to have the frame generation part and the frame termination part. In this case, the node device 1-3 to be the substitute master station is connected to an operation management device 2-2 same as the operation management device 2-1.

In the configurations shown in FIG. 10 and FIG. 11, if there were a trouble in the optical transmission lines 1a, 1b or the optical transmission line interfaces of the respective node devices 1-1 to 1-4, it is detected by a neighboring node device, and information on the trouble is put on the transmission frame, which is circulating through the respective node devices, to inform the node device 1-3 to be the substitute master station of the trouble.

The node device 1-3 to be the substitute master station having received the information on the trouble puts information for instructing to change the transmission lines or to loop back on the transmission frame circulating through the respective node devices, and the respective node devices having received the information perform processing according to the information.

Thus, if a conventional communications network system based on STM (synchronous transfer mode) had a trouble, the node device 1-3 to be a new master station operates to reconfigure the network having the trouble, but there is a disadvantage that it takes a long time from the occurrence of a trouble to the rebuilding of the system.

And, if the node device 1-3 to be the master station had a trouble, it cannot generate a transmission frame or mark its own number in the transmission frame whenever the transmission frame is generated. In such a case, a plurality of other substitute master stations detect the situation, mark their own numbers in the transmission frame to generate respective transmission frames, and circulate such transmission frames. Upon receiving such transmission frames, the other substitute master stations, if their own numbers (priority) are larger than those of the other substitute master stations, abandon the received transmission frames but if smaller than them, pass on them as they are. And, when the substitute master station receives the returned transmission frame having its own number marked, this substitute master station becomes a new master station.

As described above, the conventional communications network system based on STM (synchronous transfer mode) circulates the transmission frames to decide a master station. Therefore, it takes a long time to decide a new master station after the occurrence of a trouble in the master station, resulting in a drawback of taking a long time to reconfigure the system.

SUMMARY OF THE INVENTION

Under the circumstances, it is an object of the invention to provide a communications network system which can be rebuilt in a short time in case of a trouble.

To achieve the aforementioned object, the invention relates to a communications network system including a plurality of node devices distributed at a plurality of positions and transmission lines for connecting the plurality of node devices, one of the plurality of node devices being set as a master station to operate the system, wherein each node device comprises:

inquiring means for making an inquiry in an asynchronous transmission mode among the respective node devices when the master station has a trouble;

confirming means for confirming that there is no node device having a higher priority than its own node device based on an inquired result by the inquiring means; and master station setting means for setting whether its own node device becomes a substitute master station in place of the troubled master station based on a confirmation result by the confirming means.

The communications network system may further comprise loopback means for looping back the transmission lines at node devices next to the troubled master station.

The inquiring means may comprise cell transmission/receipt means for transmitting/receiving data in the form of cells to make the inquiry.

The communications network system may be configured so that the inquiring means makes an inquiry to a node device having a higher priority by one level than itself; and the confirming means confirms that when there is no node device having a higher priority than itself and an inquiry is made by a node device having a lower priority than itself, there is no node device having a higher priority than itself.

And, the communications network system may be configured so that the inquiring means makes an inquiry to a node device having the highest priority in the system excluding the master station when the priority of itself is not highest in the system excluding the master station, and the confirming means confirms that there is no node device having a higher priority than itself after receiving inquiries from all of the node devices.

The invention also relates to a communications network system, which comprises a plurality of node devices distributed at a plurality of positions and transmission lines for connecting the plurality of node devices, one of the plurality of node devices being set as a master station to operate the system, wherein each node device comprises:

judging means for judging, when the master station has a trouble, whether itself is a node device adjacent to the troubled master station; and master station setting means, when the judging means has judged that the own node device is adjacent to the troubled master station, for judging whether it has a higher priority than other node device which is also next to the troubled master station and when it has a higher priority than the other node device, setting itself as the master station.

The communications network system may further comprise loopback means for looping back the transmission lines at node devices next to the troubled master station.

And, the invention relates to a method for rebuilding a communications network system including a plurality of node devices distributed at a plurality of positions and transmission lines for connecting the plurality of node devices, one of the plurality of node devices being set as a master station to operate the system, wherein the method comprises the steps of:

making an inquiry in an asynchronous transmission mode among the node devices when the master station has a trouble;

confirming that there is no node device having a higher priority than itself based on the inquired result; and determining a substitute master station which operates the system instead of the troubled master station based on the confirmed result.

The method of rebuilding a communications network system may be configured so that when the master station has a trouble, the node devices next to the troubled master station perform loopback of the transmission lines.

And, the method of rebuilding a communications network system may be configured to make the inquiry among the node devices by transmitting/receiving data in the form of cells.

The method of rebuilding a communications network system may be configured, so that the individual node device makes an inquiry to a node device having a higher priority by one level than itself; and each node device sets itself as a master station when there is no node device having a higher priority than itself and an inquiry is made by a node device having a lower priority than itself.

The method for rebuilding a communications network system may be configured so that the priority of the individual node devices and the node device having the highest priority in the system are set in advance;

the inquiry is made to the node device having the highest priority in the system excluding the master station when own node device does not have the highest priority in the system excluding the master station; and the node device having the highest priority in the system excluding the master station determines itself as a new master station after receiving inquiries from all node devices.

Also, the invention relates to a method for rebuilding a communications network system including a plurality of node devices distributed at a plurality of positions and transmission lines for connecting the plurality of node devices, one of the plurality of node devices being set as a master station to operate the system, wherein:

the individual node device judges, when the master station has a trouble, whether itself is next to the troubled master station; and when the judging means has judged that it is adjacent to the troubled master station, it is judged whether itself has a higher priority than other node device which is also next to the troubled master station and, if it is higher than the other node device, it is set as the master station.

The method for rebuilding a communications network system may be configured so that when the master station has a trouble, the node devices next to the troubled master station perform loopback of the transmission lines.

Since the invention does not use a frame to circulate periodically, a frame generation part and a frame termination part which were required in an STM network are eliminated. And, since the respective node devices which have detected the trouble of the master station can make an inquiry for deciding a new master station at the same time, the system can be rebuilt in a short time.

BEST MODE FOR CARRYING OUT THE INVENTION

A communications network system according to the invention will be described in detail with reference to the accompanying drawings.

Figure 1:
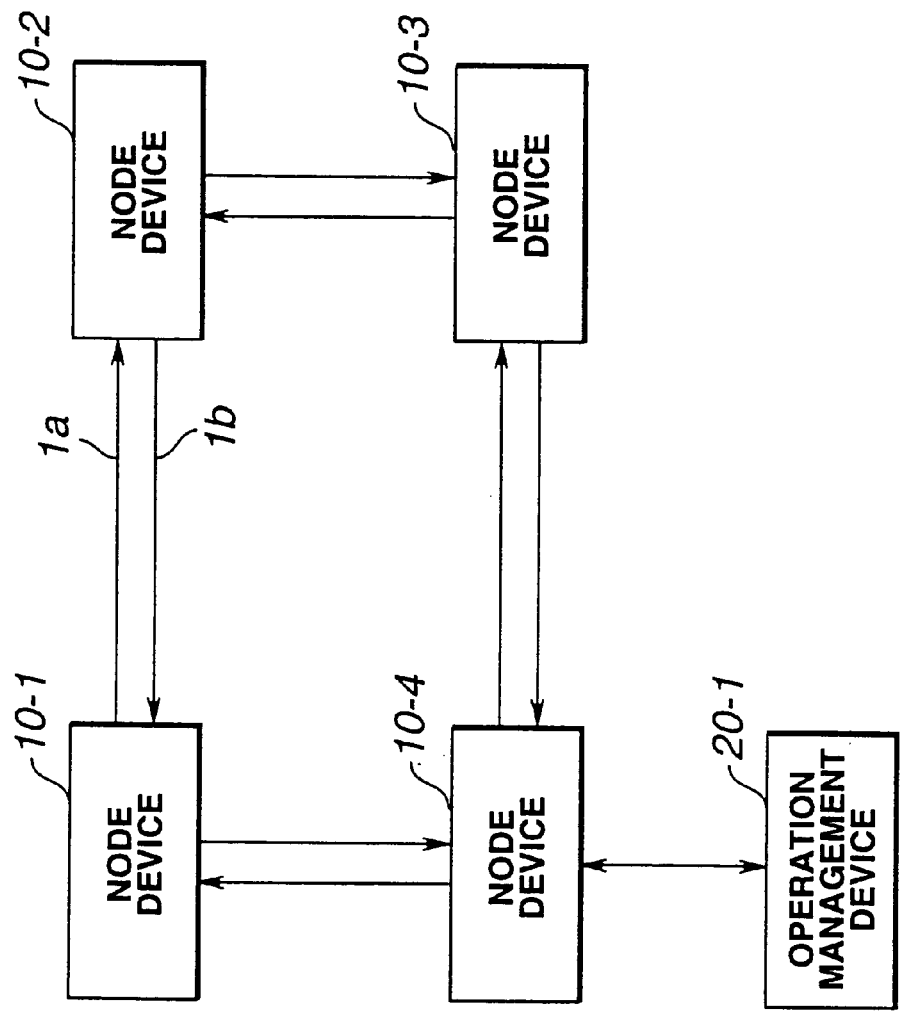
FIG. 1 is a block diagram showing an embodiment of the communications network system according to the invention.

FIG. 1 is a block diagram showing an embodiment of the communications network system according to the invention.

The communications network system shown in FIG. 1 consists of four node devices 10-1 to 10-4 connected through optical transmission lines 1a, 1b using ATM (asynchronous transfer mode).

In this communications network system, the node device 10-1 among the four node devices 10-1 to 10-4 is determined as a master station, and the node device 10-1 to be the master station is connected to an operation management device 20-1 which collects information on operation conditions of the node devices 10-1 to 10-4 and the transmission lines 1a, 1b and displays the collected results on, for example, a screen.

The respective node devices 10-1 to 10-4 in the system configured as described above have a transmission/reception means for transmitting/receiving data in the form of cells in an asynchronous transfer mode. Thus, connection to ATM communications equipment being developed quickly these years is facilitated, and various types of media such as voice, image and data which are in the merits of the ATM can be processed at the same time.

Figure 2:
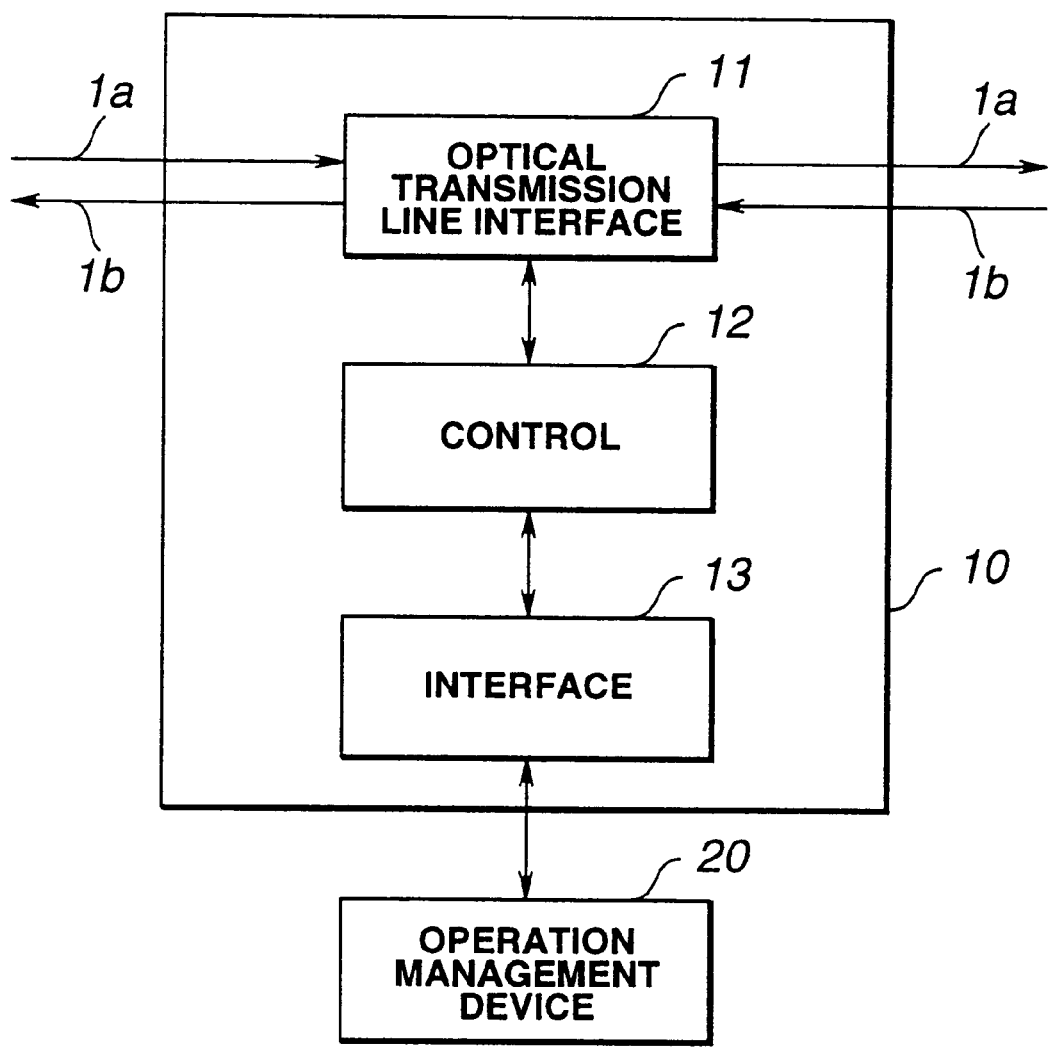
FIG. 2 is a block diagram showing a detailed configuration of the node device shown in FIG. 1.

FIG. 2 shows a detailed structure of the node device 10-1 shown in FIG. 1. In FIG. 2, the optical transmission lines 1a, 1b are connected to an optical transmission line interface 11 of the node device 10-1. The operation management device 20-1 or other external interfaces, for example, a monitoring camera, a display and the like are connected to an interface 13. And, a control 12 controls comprehensively the entire operation of the node device 10-1. The other node devices 10-2 to 10-4 are also configured in the same way as the node device 10-1.

This communications network system performs point-to-point communications among the node devices 10-1 through 10-4. Therefore, the node devices 10-1 to 10-4 do not require a frame generation part for generating a transmission frame to circulate in the network or a frame termination part for examining the transmission frame having come back after circulating.

Figure 3:
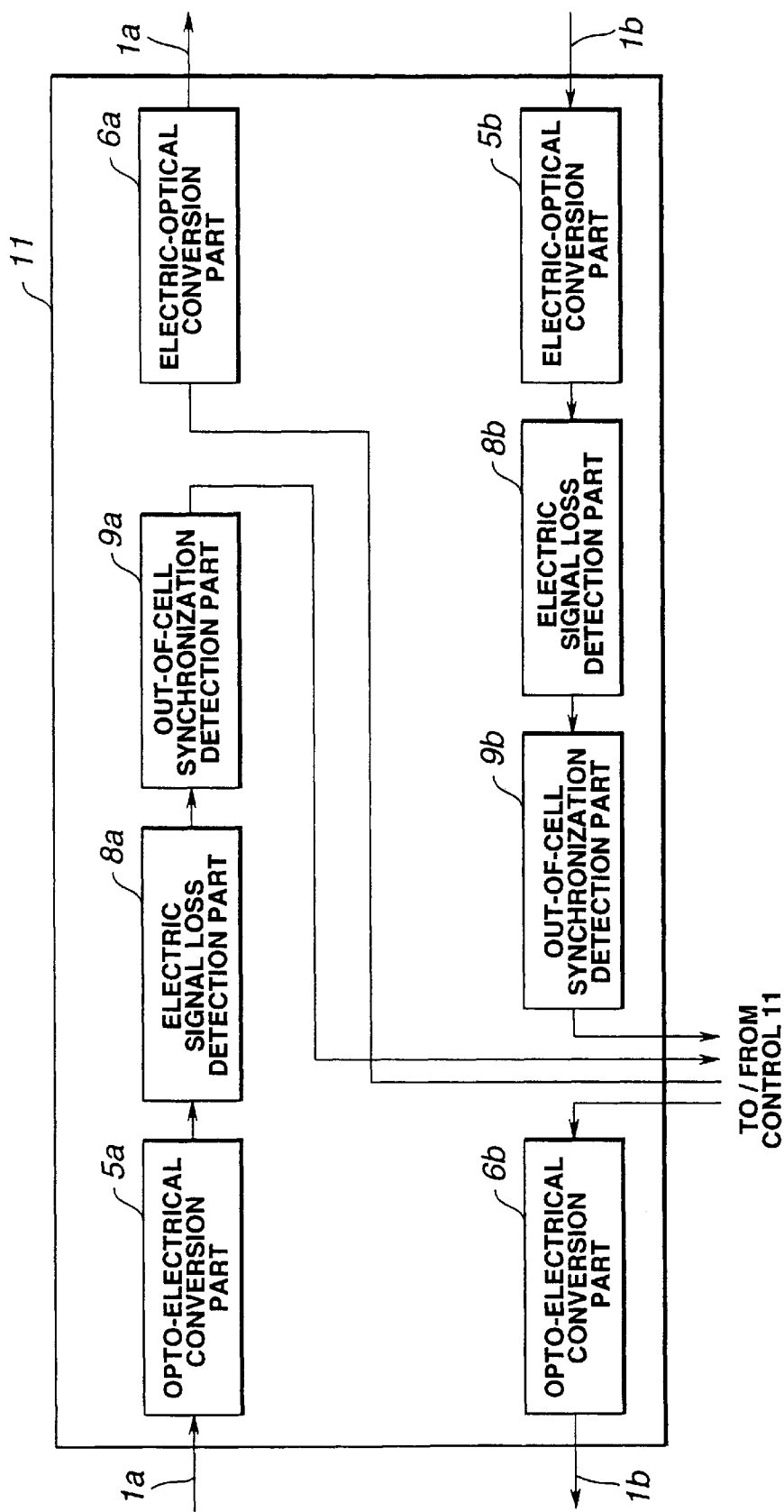
FIG. 3 is a block diagram showing a detailed configuration of an optical transmission line interface shown in FIG. 2.

FIG. 3 is a block diagram showing a detailed structure of the optical transmission line interface 11 shown in FIG. 2. The optical transmission line interface 11 shown in FIG. 3 comprises opto-electrical conversion parts 5a, 5b, optical signal loss detection parts 8a, 8b for detecting that an optical signal is lost when the optical transmission lines 1a, 1b are disconnected, out-of-cell-synchronization detection parts 9a, 9b for detecting whether the out-of-cell-synchronization has occurred upon receiving it, and electric-optical conversion parts 6a, 6b.

Figure 4:
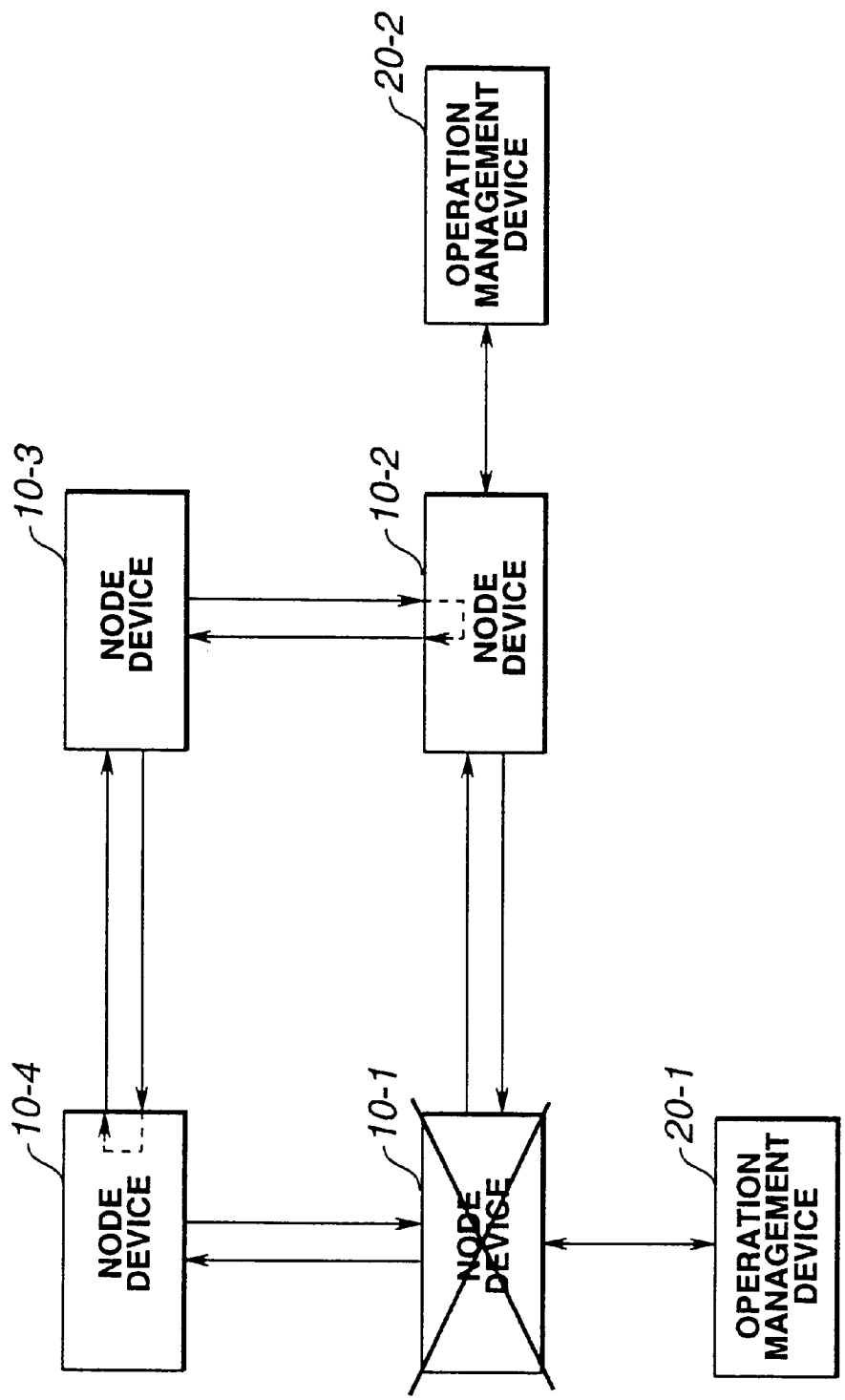
FIG. 4 is a diagram showing that the system is configured as shown in FIG. 1 is rebuilt when a master station had a trouble.

FIG. 4 shows a state that the system is rebuilt when the node device 10-1 as the master station had a trouble.

In FIG. 4, it is assumed that the node device 10-1 as the master station has priority number 1, the node devices 10-2, 10-3, 10-4 have priority numbers 2, 3, 4 respectively. A higher priority is given when the priority number is smaller.

If the node device 10-1 as the master station had a trouble, the respective node devices 10-1 to 10-3 judge that the node device 10-1 as the master station has a trouble because they cannot receive a monitoring cell from the node device 10-1 as the master station, and based on the predetermined priority numbers, make an inquiry to the node device having a higher priority than they have.

For example, the node device 10-3 having the priority number 3 makes an inquiry to the node device 10-2 having the priority number 2, and the node device 10-4 having the priority number 4 makes an inquiry to the node device 10-3 having the priority number 3. And, the inquired node devices send a response to the inquiring node devices.

But, the node device 10-2 having the priority number 2 does not make an inquiry because the node device 10-1 as the master station having the priority number 1 has the trouble. And, the node device 10-2 having the priority number 2 now has the highest priority because of the trouble in the node device 10-1 having the priority number 1 and upon receiving an inquiry from the node device 10-3 having the priority number 3, becomes a new master station.

However, the node device 10-3 having the priority number 3, which is inquired by the node device 10-2 having the priority number 2, recognizes that there is another node device having a higher priority number and does not become a master station.

Similarly, the node device 10-4 having the priority number 4 receives an inquiry from the node device 10-3 having the priority number 3 but recognizes that there is another node device having a higher priority and does not become a new master station.

In other words, since the node device 10-2 having the priority number 2 does not have a node device to make an inquiry to because the node device 10-1 having the priority number 1 has the trouble, it becomes a master station when it receives an inquiry from and responds to the node device 10-3 having a lower priority.

Together with the operation as described above, the node devices 10-2, 10-4 which are next to the node device 10-1 as the master station detect the out-of-cell-synchronization by the out-of-cell-synchronization detection part 9a or 9b of the transmission line interface 11 and conduct loopback because they receive an indefinite signal due to the trouble in the node device 10-1 as the master station .

Thus, since an inquiry is made from the node devices having a lower priority by one level to the node devices having a higher priority by one level at the same time, the system can be rebuilt in a short time after the occurrence of the trouble.

And, by connecting an operation management device 20-2 to the node device as the new master station, e.g., the node device 10-2, the operation management device 20-2 falls in operation.

Figure 5:
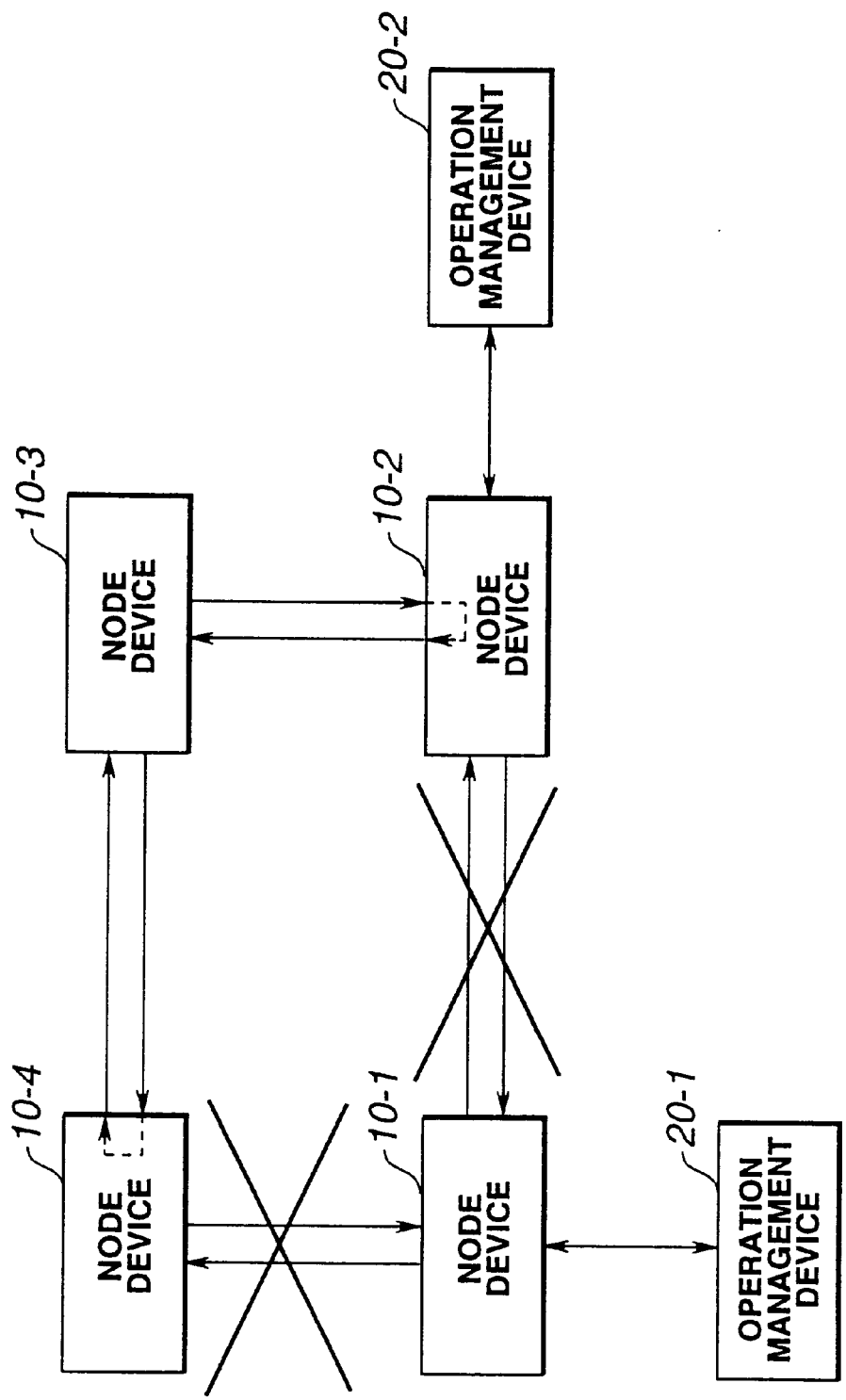
FIG. 5 is a diagram showing that the system configured as shown in FIG. 1 is rebuilt when both optical transmission lines connected to a master station had a trouble such as breakage.

FIG. 5 shows a state that the system is rebuilt if both the optical transmission lines 1a, 1b connected to the node device 10-1 as the master station had a trouble such as breakage.

In this case, the node device 10-1 as the master station connected to the troubled optical transmission lines 1a, 1b recognizes that the transmission lines have a trouble because it cannot receive an optical signal. Thus, it is isolated.

And, since the node devices 10-2, 10-4 connected to the troubled optical transmission lines 1a, 1b cannot receive an optical signal, they detect that an optical signal is cut by means of the optical signal loss detection part 8a or 8b of the optical transmission line interface 11 and make loopback.

At the same time, the respective node devices 10-1 to 10-4 decide a new master station in a short time by the same process as described above and reconfigure the system.

Figure 6:
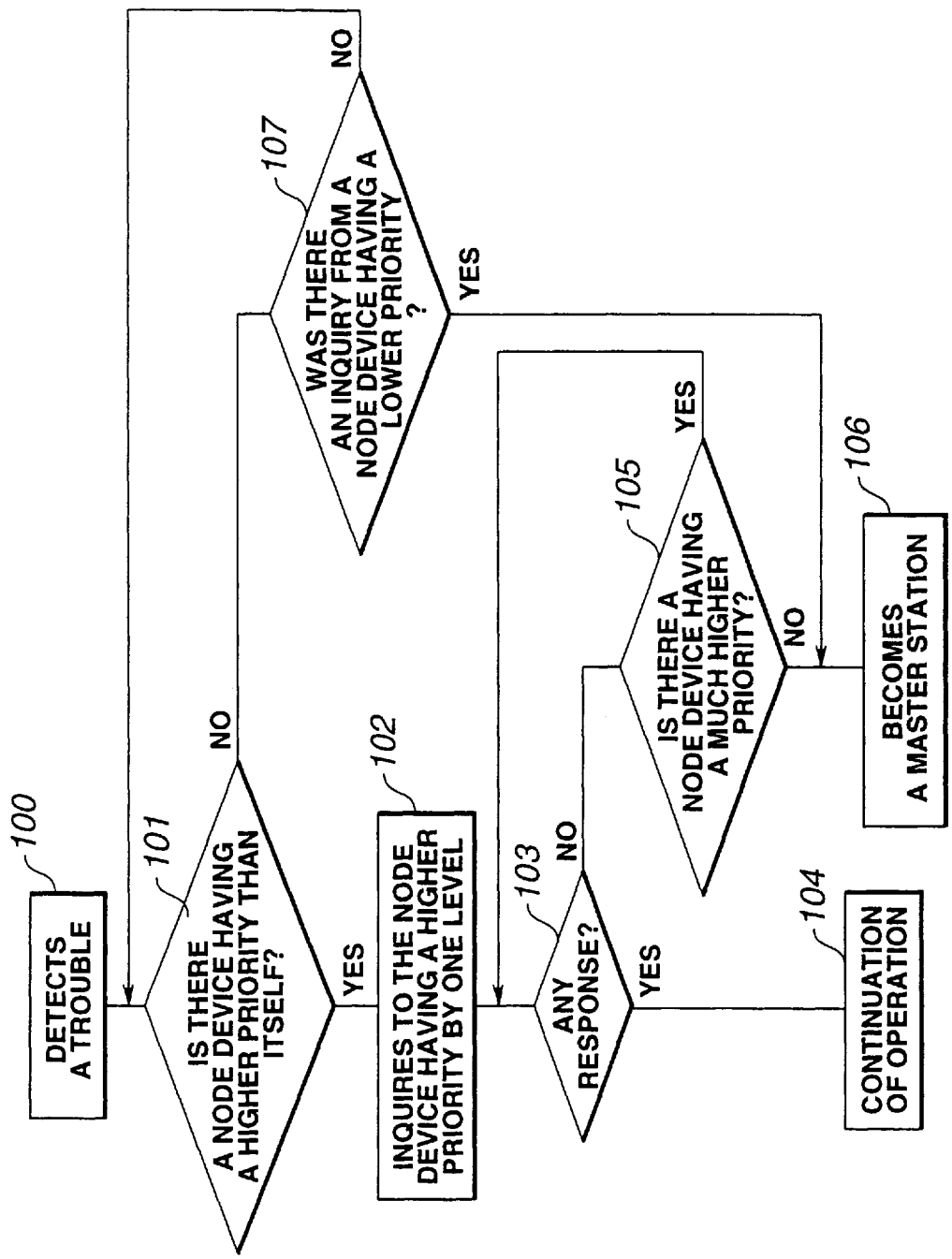
FIG. 6 is a flowchart showing an embodiment of processing performed by each node device to decide a new master station in order to reconfigure the system.

FIG. 6 shows a flowchart of deciding a new master station by the individual node device to reconfigure the system.

The individual node device, if it cannot receive a monitoring cell from the node device as the master station, detects the situation as a trouble (step 100). And the individual node device examines if there is a node device having a priority higher than itself on the basis of a predetermined priority (step 101).

When it is judged that there is a node device having a higher priority than itself (YES in step 101), an inquiry is made to the node device having a higher priority by one level than itself (step 102).

Then, it is checked if a response is made to the inquiry (step 103), and when there is a response, it does not become a master station and continues to operate as a slave station (step 104).

And, when it is judged in step 3 that there is no response (NO in step 103), it is checked whether there is another anode device having a priority further higher by one level than itself (step 105). If there is a node device having a priority further higher by one level than itself (YES in step 105), the process returns back to step 103. But, if there is not a node device having a priority further higher by one level than itself (NO in step 105), it becomes a master station (step 106).

When it is judged in step 101 that there is no node device having a higher priority than itself (No in step 101), it is checked whether an inquiry is made by a node device having a lower priority than itself (step 107). And when there is no inquiry made by a node device having a lower priority (NO step 107), the process returns back to step 101, but when there is an inquiry made by a node having a lower priority (YES in step 107), it becomes a new master station (step 106).

The process of deciding the master station as shown in FIG. 6 is configured so that a node device having a highest priority among others which can respond excluding the troubled master station is decided as a new master station, but either of the two node devices next to and having detected the troubled master station may become independently a master station based on the predetermined priority.

In the above-described configuration, the individual node device has the following setting information.

1) Priority number PO of the individual node device
2) Priority number PL of the node device connected to the left of the individual node device
3) Priority number PR of the node device connected to the right of the individual node device
4) Priority number PP of the master station
5) Priority number PPL of the node device connected to the left of the master station
6) Priority number PPR of the node device connected to the right of the master station For example, when the node device 10-1 as the master station has a trouble as shown in FIG. 4, the node device 10-2 connected to the right of the node device 10-1 as the master station has the following setting information.

1) PO=2
2) PL=1
3) PR=3
4) PP=1
5) PPL=4
6) PPR=2

And, the node device 10-4 connected to the left of the node device 10-1 as the master station has the following setting information.

1) PO=4
2) PL=3
3) PR=1
4) PP=1
5) PPL=4
6) PPR=2

In this configuration, when either of the two node devices 10-2, 10-4 which are next to and have detected the troubled master station node device 10-1 has the above-described settings, the node device 10-2 becomes independently a master station based on the predetermined priority.

Figure 7:
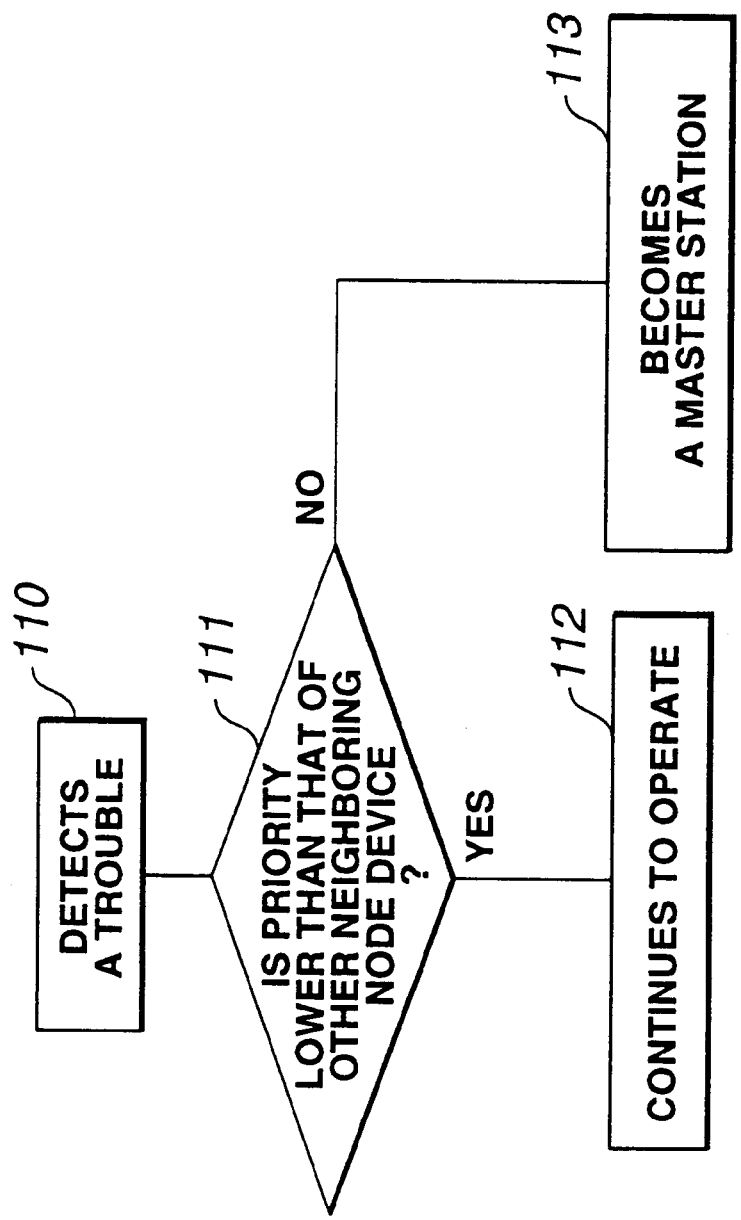
FIG. 7 is a flowchart showing another embodiment of processing performed by each node device to decide a new master station in order to reconfigure the system.

FIG. 7 shows a flowchart of deciding a new master station among the node devices to reconfigure the system configured as described above.

When there is a situation that a node device cannot receive a monitoring cell from the node device as the master station, the node device detects the situation as a trouble (step 110). And, based on the predetermined setting information described above, one of the node devices next to the troubled master station detected checks whether its priority is lower than that of the other neighboring node device (step 111). Specifically, when the two node devices 10-2, 10-4 next to the node device 10-1 as the master station have the above setting, it is checked which of them has a smaller PO.

When it is judged that it has a priority lower than that of the other neighboring node device (YES in step 111), it does not become a master station but continues to operate as a slave (step 112).

And, when it is judged in step 111 that it has a priority higher than that of the other neighboring node device (NO in step 111), it becomes a master station (step 113).

It may also be configured that the individual node device having detected the trouble of the master station makes an inquiry to the node device having the highest priority excluding the master station, and the node device having the highest priority excluding the master station becomes a master station upon receiving an inquiry from all the other node devices excluding the master station and itself.

In such a configuration, the individual node device has the following setting information.

Figure 8:
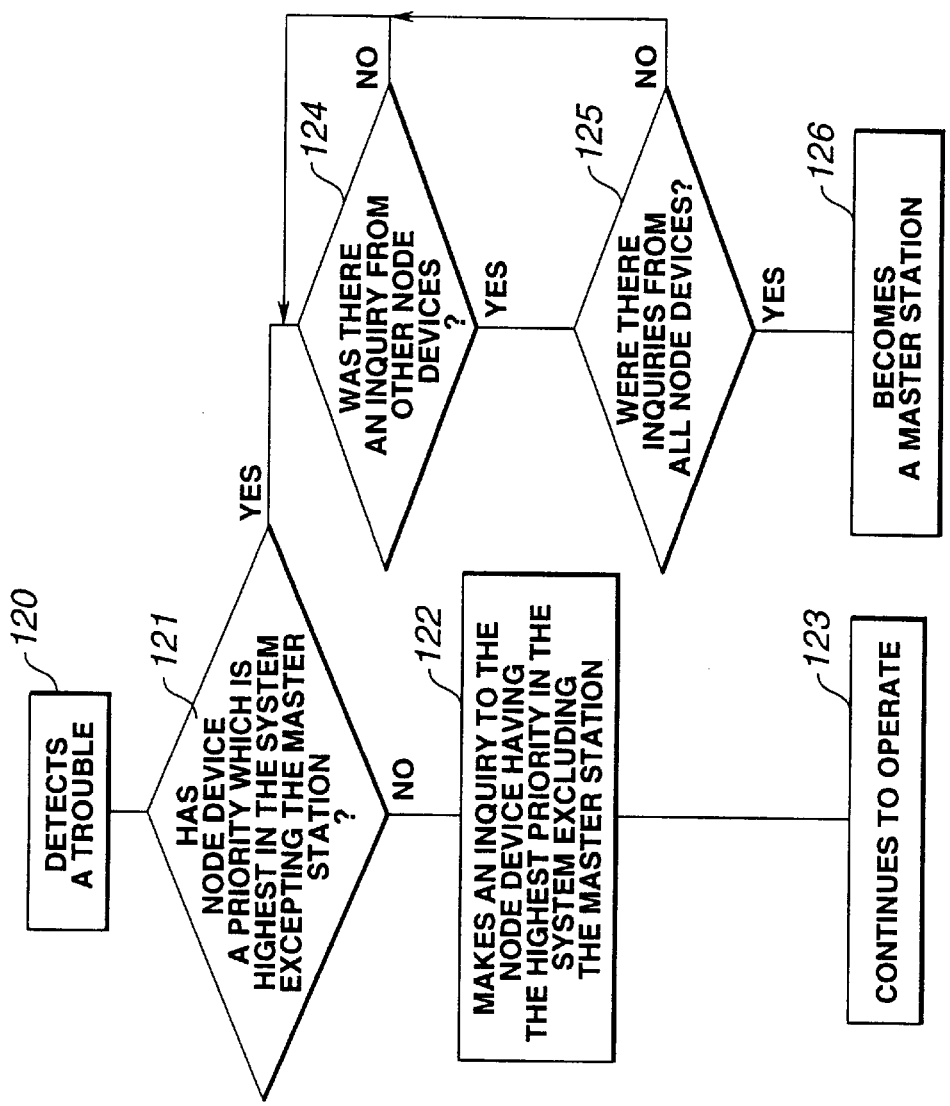
FIG. 8 is a flowchart showing still another embodiment of processing performed by each mode device to decide a new master station device in order to reconfigure the system.

1) Priority number of its own
2) Priority number having the highest priority in the system FIG. 8 shows a flowchart of deciding a new master station among the respective node devices to reconfigure the system having the above-described configuration.

The individual node device, if it cannot receive a monitoring cell from the node device as the master station, judge that there is a trouble (step 120). And based on the predetermined setting information described above, the individual node device checks whether its priority is highest in the system excluding the master station (step 121).

When it is judged that it does not have the highest priority in the system (NO in step 122), it makes an inquiry to the node device having the highest priority in the system excluding the master station (step 122) and continues to operate as a slave (Step 123).

And, when it is judged in step 121 that it has the highest priority in the system (YES in step 122), it waits for an inquiry from the other node devices (step 124) and when there are inquiries from all the node devices (YES in step 125), it becomes a master station (step 126).

Figure 9:
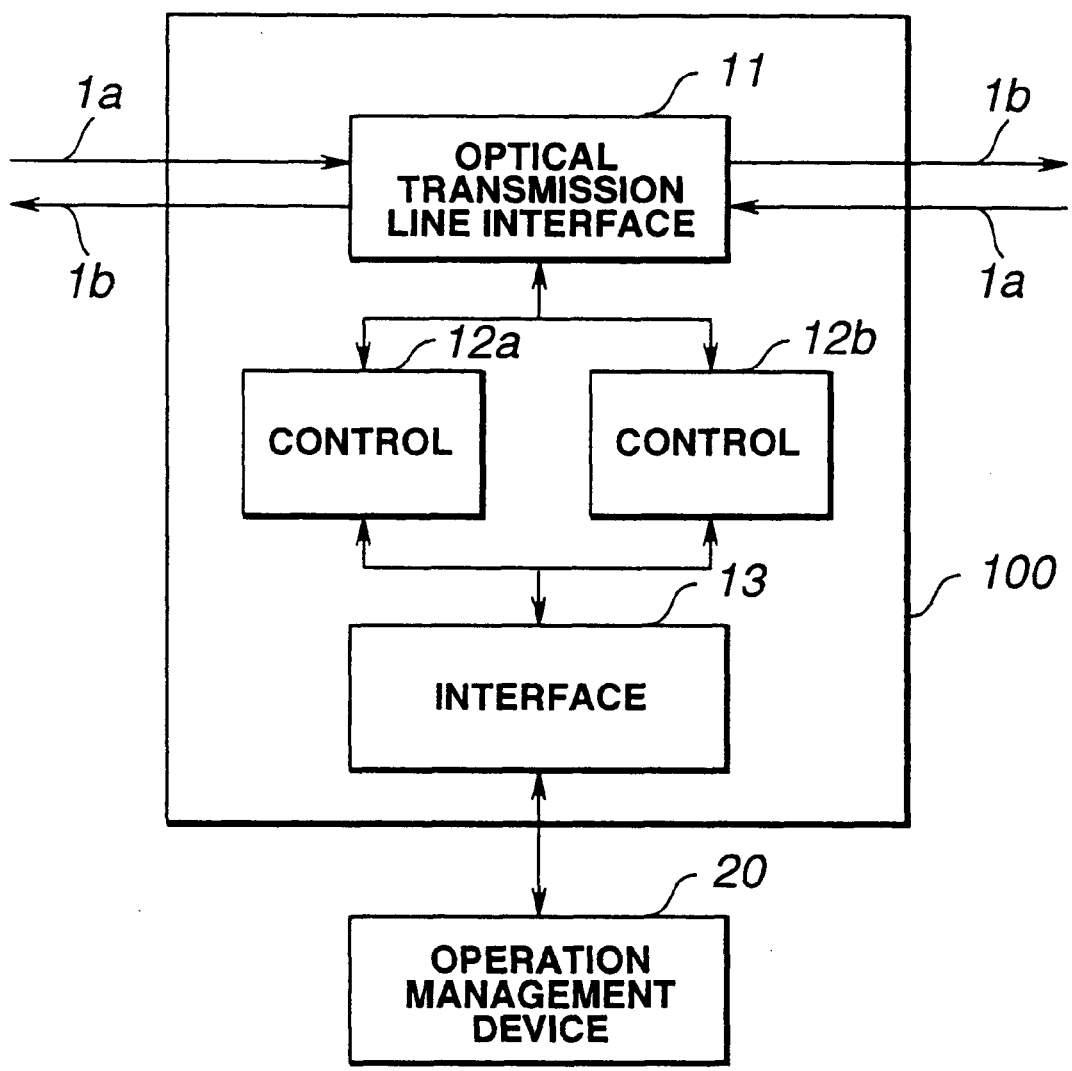
FIG. 9 is a block diagram showing the structure of a center device which may be disposed in a central monitoring office or the like among the node devices shown in FIG. 1.
Figure 10:
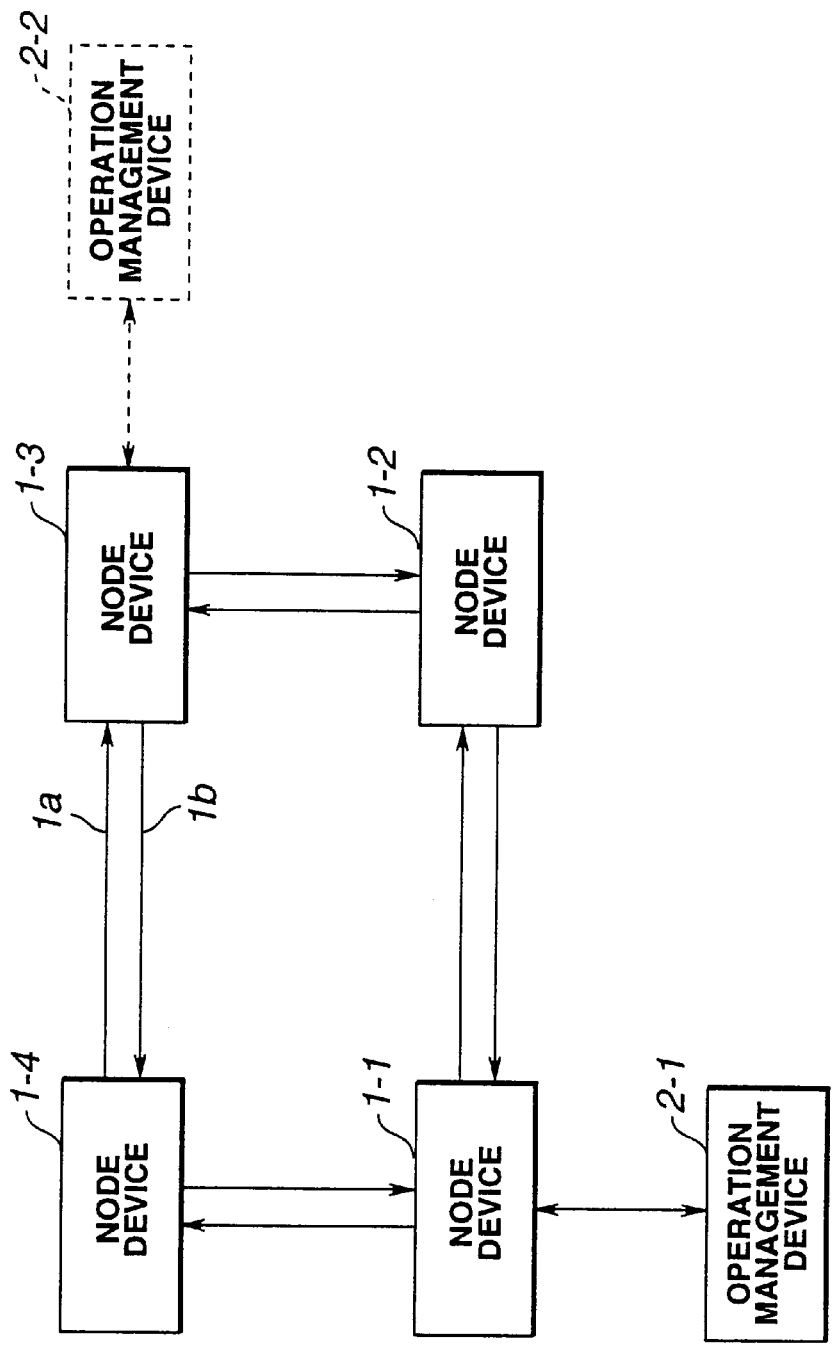
FIG. 10 is a block diagram showing a conventional communications network system based on STM (synchronous transfer mode)
Figure 11:
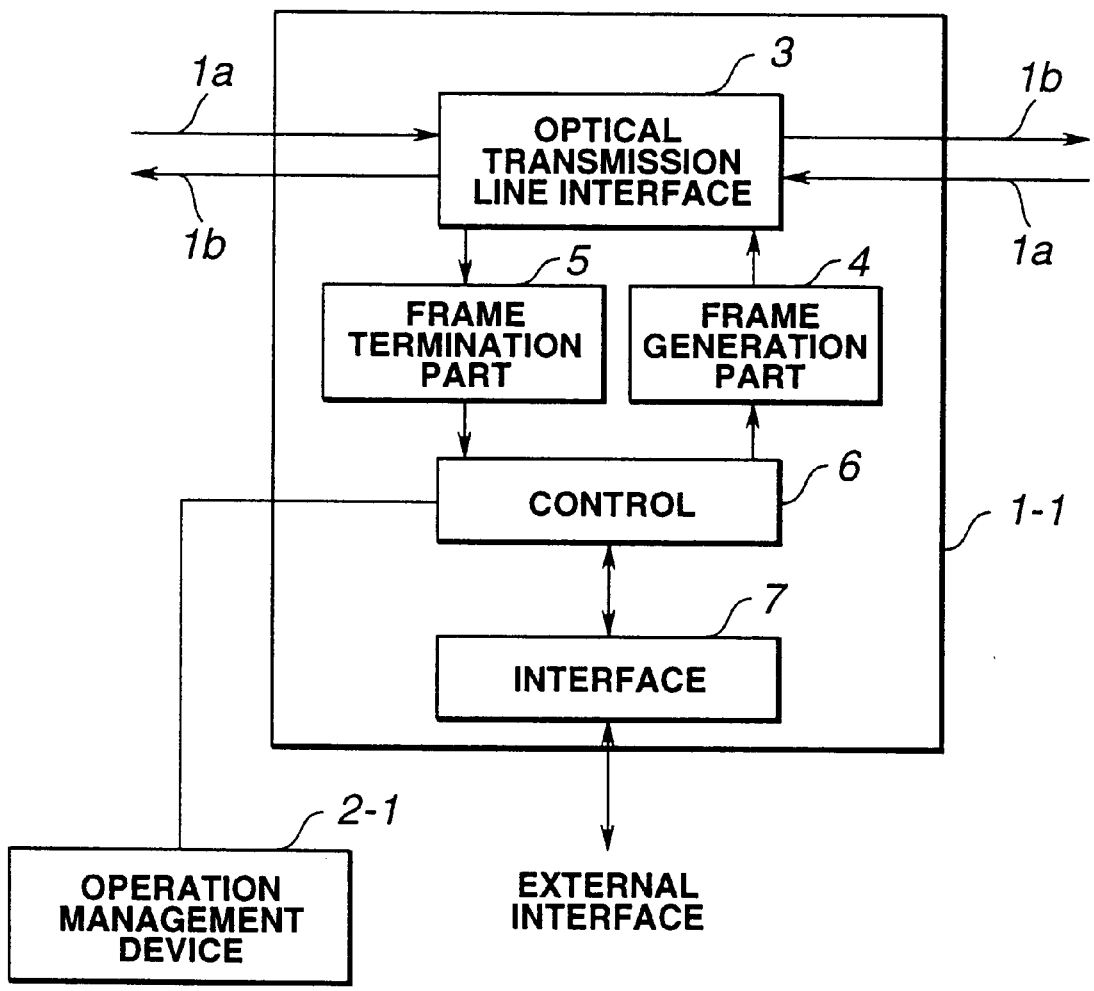
FIG. 11 is a block diagram showing a detailed structure of a node device determined as a master station in the configuration shown in FIG. 10.

FIG. 9 shows the configuration of a center device 100 which may be disposed in a central monitoring room or the like among the node devices 10-1 to 10-4 shown in FIG. 1.

In FIG. 9, the center device 100 has a redundant structure and includes controls 12a, 12b as a control part. The control 12a is normally used to perform life monitoring and copying of information with the control 12b.

when the control 12a has a trouble, the control 12b recognizes that there was a trouble in the life monitoring of the control 12a, and the control 12b operates.

INDUSTRIAL APPLICABILITY

The invention can be applied to a wide area network or a local area network (LAN). According to the invention, a transmission frame is not used to circulate through an individual node, then a master station does not need a frame generation part and a frame termination part. If the master station has a trouble, node devices having detected the trouble check simultaneously that no other node device has a priority higher than they have, and a new master station is decided. Therefore, time from the occurrence of a trouble to the decision of a new master station and the rebuilding of the system is made shorter as compared with a conventional system. Thus, a trouble recovery time required to be short in communications such as pictorial communications can be made short, and a duration of distorted images is made short.

What is claimed is:

1. A communications network system including a plurality of node devices distributed at a plurality of positions and transmission lines for connecting the plurality of no node devices in a ring-shaped configuration, one of the plurality of node devices being set as a master station to operate the system, wherein each node device comprises:

detection means for detecting a trouble by determining that a monitor signal from the master station was not received;

inquiring means for making an inquiry in an asynchronous transmission mode among the respective node devices when the detection means detects that the trouble has occurred with the master station;

confirming means for confirming that there is no node device having a higher priority than itself based on an inquired result by the inquiring means; and master station setting means for setting the node device, if the confirming means confirmed that there is no node device having a higher priority than itself, as a substitute master station in place of the troubled master station.

2. The communications network system according to claim 1, further comprising loopback means for looping back the transmission lines at node devices next to the troubled master station when the detection means has detected that the trouble has occurred with the master station.

3. The communications network system according to claim 1, wherein the inquiring means comprises cell transmission/reception means which performs the inquiry by transmitting/receiving data in the form of cells.

4. The communications network system according to claim 1, wherein:

the inquiring means makes an inquiry to a node device having a higher priority by one level than itself; and the confirming means confirms that, when there is no node device having a higher priority than itself and an inquiry is made by a node device having a lower priority than itself, there is no node device having a higher priority than itself.

5. The communications network system according to claim 1, wherein:

the inquiring means makes an inquiry to a node device having a highest priority in the system excluding the master station when the priority of its own node device is not highest in the system excluding the master station, and the confirming means confirms that there is no node device having a higher priority than its own node device when receiving inquiries from all of the node devices.

6. A communications network system including a plurality of node devices distributed at a plurality of positions and transmission lines for connecting the plurality of node devices in a ring-shaped configuration, one of the plurality of node devices being set as a master station to operate the system, wherein each node device comprises:

detection means for detecting a trouble by determining that a monitor signal from the master station was not received;

judging means for judging when the detection means has detected that the trouble has occurred in the master station, whether its own node device is adjacent to the troubled master station; and master station setting means, when the judging means has judged that the own node device is adjacent to the troubled master station, for judging whether the own node device has a higher priority than other node device which is also next to the troubled master station and setting the node device which was judged to have the high priority as a substitute master station in place of the troubled master station.

7. The communications network system according to claim 6, further comprising loopback means for looping back the transmission lines at the node devices next to the troubled master station when the detection means detects that the trouble has occurred with the master station.

8. A method for rebuilding a communications network system in which a plurality of node devices distributed at a plurality of positions are connected in a ring-shaped configuration by transmission lines, one of the plurality of node devices being set as a master station to operate the system, and wherein the system is rebuilt when a trouble occurs with the master station, the method comprising the steps of:

making an inquiry in an asynchronous transmission mode among the node devices when the trouble has occurred with the master station; and determining one of the plurality of node devices, which has no node devices with a higher priority than itself, as a substitute master station which operates the system instead of the troubled master station.

9. The method of rebuilding a communications network system according to claim 8, further comprising the step of looping back the transmission lines at node devices next to the troubled master station, when the trouble has occurred in the master station.

10. The method of rebuilding a communications network system according to claim 8, wherein the inquiry among the node devices is made by transmitting/receiving data in the form of cells.

11. The method of rebuilding a communications network system according to claim 8, wherein:

each node device makes the inquiry to a node device having a higher priority by one level than itself; and each node device sets itself as a master station when there is no node device having a higher priority than itself and an inquiry is made by a node device having a lower priority than itself.

12. The method for rebuilding a communications network system according to claim 8, wherein:

the priority of the individual node devices and the node device having the highest priority in the system are set in advance;

the inquiry is made to the node device having the highest priority in the system excluding the master station when the own node device does not have the highest priority in the system excluding the master station; and the node device having the highest priority in the system excluding the master station sets itself as a master station when receiving inquiries from all of the node devices.

13. A method for rebuilding a communications network system in which a plurality of node devices distributed at a plurality of positions are connected in a ring-shaped configuration by transmission lines, one of the plurality of node devices being set as a master station to operate the system, and wherein the system is rebuilt when a trouble has occurred in the master station, the method comprising the steps of:

at least one of the plurality of node devices judging, when the trouble has occurred with the master station, whether, it is next to the troubled master station;

when judged that the node device is adjacent to the troubled master station, judging whether the node device has a higher priority than other node device which is also next to the troubled master station; and setting the node device, which was judged to have a higher priority than the other node device next to the troubled master station, as a substitute master station in place of the troubled master station.

14. The method for rebuilding a communications network system according to claim 13, further comprising the step of looping back the transmission lines at the node devices next to the troubled master station when the trouble has occurred with the master station.

* * * * *